United States Patent [19]

Ehrat

[11] 3,806,874

[45] Apr. 23, 1974

[54] IDENTIFICATION SYSTEM FOR INDIVIDUALS

[75] Inventor: Kurt Ehrat, Zurich, Switzerland

[73] Assignee: Gretag Aktiengesellschaft, Regensdorf, Switzerland

[22] Filed: Apr. 10, 1973

[21] Appl. No.: 349,862

[30] Foreign Application Priority Data
  Apr. 11, 1972 Switzerland.......................... 5286/72
  Apr. 27, 1972 Switzerland.......................... 6330/72
  Dec. 5, 1972 Switzerland....................... 17645/72

[52] U.S. Cl............................ 340/149 R, 340/152 T
[51] Int. Cl........................ G08b 29/00, G11b 9/02
[58] Field of Search ......... 340/149 R, 164 R, 152 T

[56] References Cited
UNITED STATES PATENTS
3,654,604   4/1972   Crafton........................ 340/149 R X
3,754,214   8/1973   Matsumoto et al............. 340/149 R Primary Examiner—Donald J. Yusko
Attorney, Agent, or Firm—Pierce, Schleffler & Parker

[57] ABSTRACT

The identification unit described in this specification comprises a testing station for identifying each of a plurality of identification units adapted to be carried or worn by authorized personnel. Each unit has data stored therein which is different from the data stored in other units and includes a generator for generating first and second data pulse sequences in accordance with the stored data; the testing station also includes a store for storing data and a generator for generating in response to the contents of its associated store pulse sequences identical to the pulse sequences generated by each unit so that when a unit is coupled to the testing station a comparator in that unit compares the first pulse sequence generated thereby with the first pulse sequence generated by the testing station and if the sequences are found to be identical causes the unit to generate the second pulse sequence which is compared in a comparator in the testing station with the second pulse sequence generated thereby to produce an identification signal if the two second pulse sequences are identical.

The circuits of each unit may be encapsulated and mounted in a wrist strap to be worn by an authorized individual and the unit may be inductively coupled or coupled by radio means to the testing station.

13 Claims, 17 Drawing Figures

IDENTIFICATION SYSTEM FOR INDIVIDUALS

FIELD OF THE INVENTION

The present invention relates to an identification system for separately identifying each of a plurality of individuals.

PRIOR ART

Systems already known have at least one testing station and a number of data media corresponding to the number of individuals, each data medium containing data which is allocated to one of the individuals and which can be called up by the testing station when the data medium is coupled thereto. The data media in the best known systems of this kind comprise cards, keys or discs on which the data which is allocated to the authorised individual is clearly recognizably perforated, punched, embossed or printed although such data cannot be deciphered. Some of these media may be duplicated without too much difficulty even if the data iteself is not visible to the naked eye, such as magnetised areas. Attempts have been made to foil unauthorized duplication of such data media by requiring the entry of a so-called memo number at the testing station before or during the identification process to cause the testing station to perform the identification operation. However, this requires more time for identification and it is moreover difficult to keep the memo number secret.

BRIEF DESCRIPTION OF THE INVENTION

It is an object of this invention to provide a system of the kind described hereinabove in which duplication of the data media is practically impossible and in which the attempt at dupliction renders the data medium itself useless in the sense that identification thereafter is necessarily indicated as "forged". Furthermore, in the preferred embodiment the amount of data allocated to the individual and stored in the data medium is at least partially inaccessible to the possessor of the data medium as well as to unauthorized persons.

Accordingly, the system proposed herein uses an identification unit as the data medium and is provided with a data generator which contains at least one store and is adapted to generate at least first and second data sequences and the testing station is provided with a data generator which contains at least one store and is adapted to generate corresponding data sequences the data medium being provided with a comparator which is adapted to respond to correspondence between the first data sequences and in the event of such correspondence being obtained, is adapted to trigger the data generator in the medium to feed the second data sequence to a second comparator which is located in the testing station and produces an acceptance signal in the event of correspondence being obtained with the second data sequences, both data generators being controlled by a common clock generator.

By making substantial use of integrated circuits the identification unit acting as a data medium may be kept as small as any handy object of daily use.

BRIEF DESCRIPTION OF THE DRAWINGS

Embodiments of the invention are described with reference to the accompanying drawings in which.

As an introduction to the description it should be noted that the same circuit elements or circuit assemblies in all embodiments are designated with the same reference numerals and similar elements or assemblies are designated with primed numerals.

The block diagrams show "connecting lines" in solid form but these need not be "a connecting conductor" but instead may be a channel through which electrical pulses or voltages can be applied between circuit elements or circuit assemblies. Where voltages and pulses are applied in time sequence, one and the same "conductor" may serve as a plurality of connecting lines or "channels".

Figure 1:
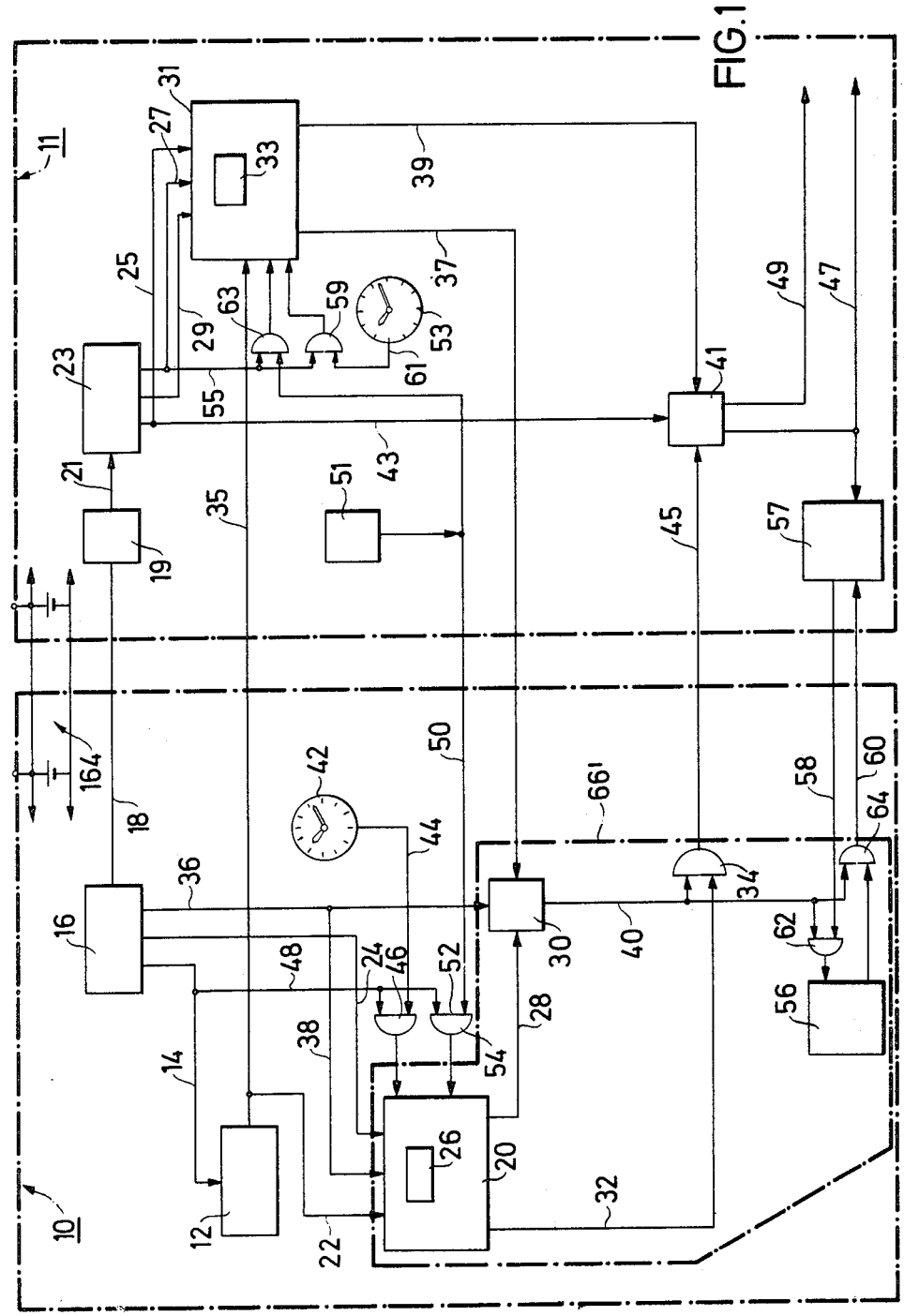
FIG. 1 is a block diagram of an identification system in accordance with the present invention suitable for the identification of bank customers.

FIG. 1 shows an identification unit 10 framed in broken-lines on the left in the position at which it is coupled to a testing station 11 framed in broken-lines on the right.

The following circuit assemblies are incorporated in the identification unit 10: a primary store 12 which is driven via a connecting line 14 by a programme control system 16 which in turn is driven through a connecting line 18, coupled to the testing station 11, by a clock generator 19 located in that testing station.

The primary store 12 comprises a plurality of electronic circuit elements, such as MOS integrated circuits forming a Read-only-memory (ROM) store in which an individual personal number with 10 decimal digits is stored as a binary number with 40 binary digits and may be recalled any number of times. The data stored in the primary store 12 comprises part of the data associated with the identification unit 10 and need not normally be kept secret.

The identification unit 10 also contains a "secret" circuit 20 whose function, inter alia, is to generate data sequences. The secret circuit 20 will be described with reference to detailed block circuit diagrams but at this point it is sufficient to note that the secret circuit is driven by the output of the primary store via connecting line 22 and by the programme control system 16 via connecting line 24. One component of the secret circuit 20 is a secret store 26 in which secret data is stored which differs from that in other identification units but, by contrast to the data stored in the primary store 12, is not known to the authorized possessor of the identification unit 10 and cannot be determined by him. The secret circuit 20 represents the data generator of the unit.

The output of the secret circuit 20 is connected via a connecting line 28 to a comparator circuit 30 and via a connecting line 32 to a gate circuit 34. The comparator circuit 30 is driven by the programme control system 16 via a connecting line 36 which has a branch 38 extending to the secret circuit 20. The second input to the comparator circuit 30 will be described when describing the operation of the testing station 11 and the output of the comparator circuit is connected by a connecting line 40 to the gate circuit 34.

The purpose of the comparator circuit 30 is to compare sequentially bit-by-bit the first data sequence from the identification unit with a data sequence from the station and in the event of correspondence being obtained to apply a binary signal 1 to the gate circuit 34.

The description has so far dealt with the construction of the identification unit. One component of the secret circuit 20 may be an encoding computer which will be described subsequently and is intended to generate the data sequences. The encoding computer is associated with an electronic clock 42 which supplies binary-digital time data to the encoding computer via a connecting line 44 and a gate circuit 46 when the gate circuit 46 is opened by a signal from the programme control system 16 via conductor 48.

Random data from a random data generator 51, located in the testing station 11, may be applied instead of or additionally to the binary-digital time data to the encoding computer in the secret circuit 20 via a connecting line 50 and a further gate circuit 54 which is opened by the signal applied over connecting line 48 from the programme control system 16.

The identification unit is provided with a further store in the form of an account store 56. Quantity data, that is to say a specific quantity relating to the authorised possessor of the identification unit 10, is stored in binary-digital form in the aforementioned account store 56. The quantity may be in currency and may for example represent the amount of money in the authorised individual's bank account. The data in the account store 56 may be stored and/or altered only when the identification unit 10 is coupled to the station 11 and when the identification of the identification unit is positive since the updating unit 57 for altering the contents of the account store 56 is located in the testing station 11 and can be activated only by a positive identification procedure as will be explained subsequently. The line 58 connecting the updating unit 57 to the account store 56 as well as the read-out line 60 are connected to gates 62 and 64 respectively, the gates 62, 64 being opened only if the comparator 30 supplies the connecting line 40 with a signal which indicates positive identification of the identification unit.

The circuit assemblies 20, 30, 34, 56, 62 and 64 as well as the connecting lines 28, 32 and 40 of the identification unit enclosed within the broken line 66 in FIG. 1 are inaccessible to unauthorised parties not only physically but also electrically and "inaccessibility" in this connection also means that unauthorised persons cannot directly or indirectly determine the electric state and/or the data content of the stores 26, 56. This may be achieved in different ways as will be explained subsequently.

As may be seen by reference to FIG. 1 the testing station 11 is provided with a programme control system 23 which is also driven by the clock generator 19 via a connecting line 20, the programme control system 23 controlling the sequence of all routines in the testing station 11.

More particularly, the programme control system 23 of the testing station controls a secret circuit 31 via connecting lines 25, 27 and 29, the secret circuit containing a secret store 33. Embodiments of the secret circuit 31 whose function corresponds approximately to that of the secret circuit 20, namely to generate the testing station data sequences, will be described subsequently.

The secret circuit 31 is driven via the connecting line 35 by the primary store 12 of the identification unit and the output of the secret circuit 31 is connected via a connecting line 37 to the comparator 30 which compares the first data sequences generated by the secret circuits 20 and 31. The output of the secret circuit 31 is also connected via a connecting line 39 to a comparator 41 which when activated by a signal applied via a connecting line 43 from the programme control system 23 compares a second data sequence from the secret circuit 31 with a second data sequence from the output of the gate circuit 34 applied over a connecting line 45. The secret circuit 31 comprises the testing station's data generator.

The comparator 41 has two output lines 47, 49, a "correct" signal appearing on the first of these lines if the comparator 41 detects correspondence between the second data sequences whilst an "incorrect" signal appears on the line 49 when there is no such correspondence. The line 47 which carries the correct signal is also connected to the updating unit 57 for the account store 56 so that the unit 57 is switched on only for as long as the correct signal persists.

The secret circuit 31 may be conditioned by a clock 53 and/or the random generator 51 in the same way as the secret circuit 20. The clock 53 supplies the secret circuit 31 or the encoding computer contained therein with time data via a line 61 and a gate 59 which is driven via the line 55 by a signal from the programme control system 23. Random data from the random generator 51 is applied to the secret circuit 31 via a gate 63 which is also driven by the signal from the programme control system over the line 55. An energy source 164 feeds the circuit assemblies of the identification unit either through direct contacts or through induction as well as those of the testing station. The unit 10 may be provided with a replaceable battery or an accumulator which is chargeable from the testing station 11.

It has already been mentioned that the term connecting line is intended to include a transmission channel and that different connecting lines may be synonymous with one and the same physical conductor. This is conditional on the use of special circuit means which will be described with reference to FIG. 2.

Figure 2:
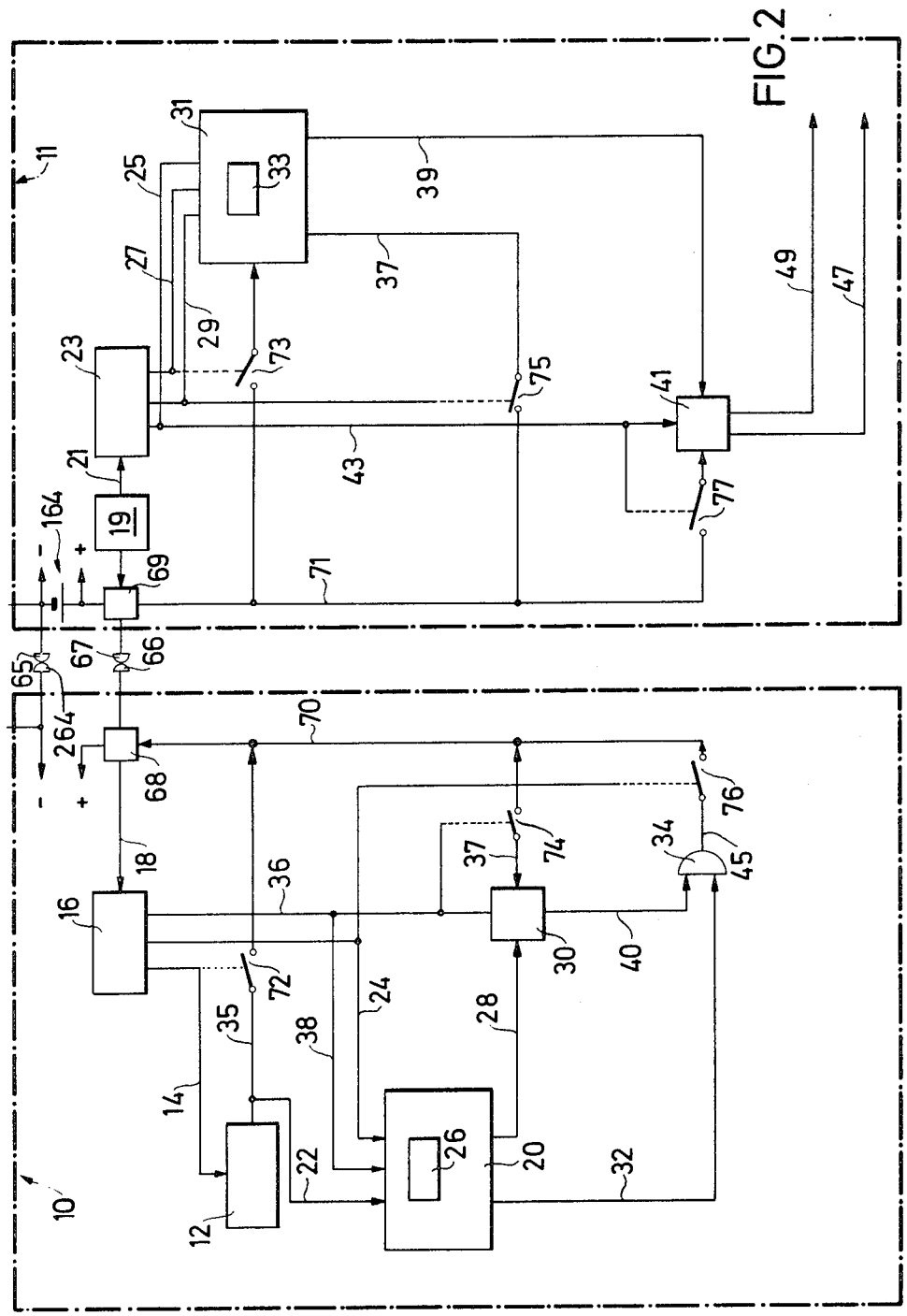
FIG. 2 is a block diagram of a variation of the system shown in FIG. 1.

FIG. 2 is a simplification of the embodiment shown in FIG. 1 omitting the clocks which supply time data, the random generator and the accounts store, however, it will be understood that these components may also be present in the embodiment of FIG. 2.

In the embodiment illustrated in FIG. 2 the entire data exchange between the identification unit 10 and the testing station 11 takes place via two sets of couplings 264, 66 on the unit and 65, 67 on the testing station. These may comprise contacts, inductive couplings or transmitting or reception aerials (see also FIG. 4).

In the present embodiment couplings 264, 65 are provided to connect a reference voltage (for example ground) to the unit 10 and the testing station 11 while the couplings 66, 67 are each connected to a switching circuit 68 or 69, respectively. The purpose of these switching circuits 68, 69 is to separate the d.c. supply voltage from a source 164 from the pulses which are applied to the switching circuits 68, 69 which divide the pulses into positive data pulses and negative timing pulses. Each of the main conductors 70, 71 are connected to three electronic time multiplex switches 72, 74, 76 and 73, 75, 77, respectively, the former switches being operated by pulses applied to the connecting lines 14, 36 and 24 respectively in the identification unit and originating from the programme control system 16 and the latter switches being operated by pulses applied to the connecting lines 27, 29 or 25, respectively originating from the programme control system 23. One time multiplex switch in the unit and a corresponding time multiplex switch in the testing station are closed simultaneously while the other switches are open. These switches which are closed simultaneously are paired as follows and in the same sequence: 72-73, 74-75 and 76-77.

Figure 3:
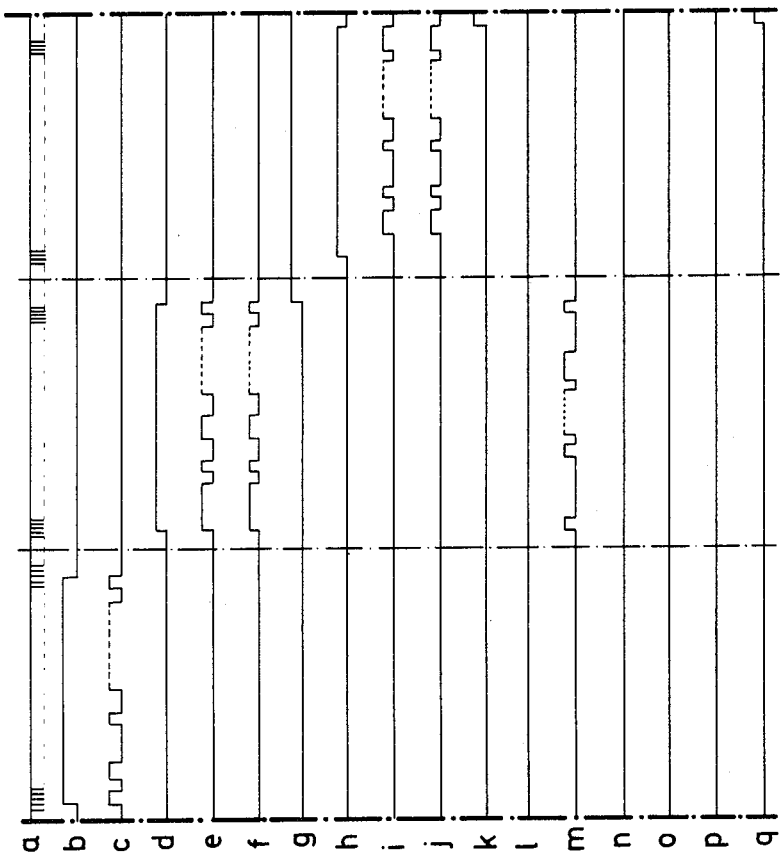
FIG. 3 shows various pulse waveforms produced in the systems shown in FIGS. 1 and 2.

FIG. 3 shows pulse diagrams illustrating the timing of the identification procedure. Each pulse diagram occupies a line designated on the left with $a$ to $q$. The first of the three columns at the right-hand end of the pulse diagrams contains the reference numeral of the circuit assembly which produces the pulse sequence illustrated on the associated line. The middle column contains the reference numeral of the connecting line over which the pulse sequence is applied while the third, right-hand column shows the reference numeral of the circuit to which the pulse sequence is applied.

Line $a$ shows the negative timing pulses produced by the clock generator 19. These pulses may have a relatively low frequency, for example 10,000 pulses per second. The clock generator 19 drives the programme control systems 16, 23 via the connecting lines 18, 21. Line $b$ shows a first, positive output signal of the programme control system 16 which causes the primary store 12 in the identification unit to deliver a positive pulse sequence 9c forming the first recognition data to the secret circuit 31 of the testing station which then produces the first data sequence 9e which in turn is applied to the comparator 30 in response to a signal 9d produced by the programme control system 23. The programme control system 16 also supplies an identical signal 9d via the connecting line 36, 38 to the secret circuit 20 in the identification unit and the last-mentioned secret circuit in turn delivers the first data sequence 9f. These two data sequences $e$ and $f$ are applied to the comparator 30 which supplies a signal 9g to open the gate circuit 34 if the two data sequences correspond one to the other.

A signal $h$ from the programme control systems 16 or 23 causes the secret circuits 20 and 31, respectively to deliver the second data sequences (lines $i$ and $j$) to the comparator 41 in the testing station. If the two data sequences are the same as illustrated in lines $i, j$, an acceptance signal will be produced on the connecting line 47 at the end of the third time interval and no signal (line 1) will appear on the connecting line 49. The signals shown on lines $m$ to $q$ result from the processes giving rise to the signals shown on lines $f, g, i, k$ and $l$ but the first data sequence line $m$ produced by the identification unit no longer coincides with the first data sequence line $e$ of the testing station so that no signal (line $n$) is produced by the comparator 30 to open the gate circuit 34 and the second data sequence (line $o$) from the secret circuit 20 is therefore not gated out by the gate 34 so that no acceptance signal is produced by the comparator 41 on the connecting line 47 (line $p$) but a rejection signal is produced on the connecting line 49.

Practically all the circuit elements in the identification unit as well as those in the testing station may take the form of integrated circuits.

Figure 4:
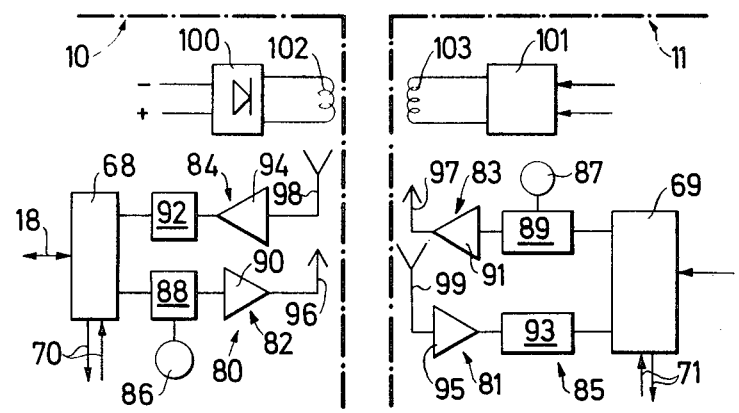
FIG. 4 shows a modification to part of the system shown in FIGS. 1 and 2 in which coupling between the identification unit and the testing station is by radio means.

FIG. 4 shows details of a modification of the embodiment described above in which the operating potentials as well as the data sequences and timing pulses are transmitted between the data identification unit 10 and the testing station 11 by radio means. The switching circuits 68 and 69 of FIG. 2, the line 18 which is connected to the programme control system 16, the line connected to the testing station clock generator 19 as well as the main conductors 70 and 71 are coupled to a duplex radio transmission systems 80 and 81 as shown in FIG. 4. Each systems has a transmission channel 82 or 83 and a reception channel 84 or 85 respectively. Each of the transmission channels 82 or 83 is provided with a modulator 88 or 89 driven by an oscillator 86 or 87 and is followed by a transmission amplifier 90 or 91 connected to a transmission aerial 96 or 97 respectively. Each of the reception channels 84, 85 is provided with a reception aerial 98 or 99 a reception amplifier 94 or 95 as well as with a demodulator 92 or 93 respectively.

Duplex transmission may operate with two different transmission frequencies so that transmission may take place simultaneously in both directions.

Since transmission is normally intended for shor distances it is possible for the transmitted power to be very low. The transmission and reception aerials may be wire loops for inductive transmission provided that they are arranged orthognally one to the other.

Energy for operating the identification unit may be transmitted inductively by means of an inverter 101 fed from a d.c. source, not shown, feeding the primary winding 103 of a transformer whose secondary winding 102 is located in the identification unit 10 the winding 102 being connected to a rectifier 100 which provides the operating voltages for the identification unit.

A first embodiment of the secret circuits is explained with reference to FIG. 5. The secret circuit 31 of the testing station 11 comprises an electronic digital encoding computer 105 and the sectet data store 33.

The basic properties of such an encoding computer will be briefly explained below.

The encoding computer operates with a timing frequency which is supplied by the programme control system 23 (FIG. 2), via the connecting lines 29, 27 and 25. Input data comprising the data from the secret store 33 and the data obtained from the primary store 12 via the connecting line 35 condition the encoding computer. In response to this input data and with the aid of an internal computer circuit, which may include a substantial number of storage positions, the encoding computer produces an encoding programme which is applied on the output line 107.

Some known properties of an encoding computer will be briefly described but these are familar to the specialist and will provide the average expert with enough information about the internal construction of the encoding computer:

An encoding programme has "pseudostatistical" properties and cannot be differentiated from a genuine random programme irrespective of the kind of input data.

The repetition cycle of the encoding programme may be very long even if the input data has a short cycle.

Any section of the encoding programme therefore has no recognizable correlation to a subsequent programme section and the latter cannot be computed from knowledge of the first programme section. This also applies if the same input data, is used to generate both programme sections. The encoding programme is identical for identical input data and differs for different input data. The input data cannot be computed from the encoding programme even if the circuit of the encoding computer is accurately known. The secret data in the secret store 33 cannot therefore be determined from knowledge of the encoding programme. If it is known that a specific encoding programme corresponds to specific input data, other associated input data cannot be computed from another encoding programme.

Even when using a single set of data from the secret store 33 as input data any desired number of different encoding programmes may be obtained by the addition of non-secret input data, for example data obtained from the primary store 12,
data from the random generator 51 (FIG. 1), or
digital time data from the clock 53 (FIG.1);
all the aforementioned encoding programmes being unequivocally coordinated with the input data but all of which do not permit data being obtained from the secret store 33.

If part of the input data such as that referred to above, the encoding programme and the encoding computer circuit are known, it is not possible to compute the remainder of the input data obtained from the secret store 33.

A much larger amount of encoding programme data may be obtained with a limited amount of input data, for example $10^5$ bits of encoding programme may be obtained with $10^2$ bits of input data.

All these properties render the encoding computer ideally suited for use in the present identification system. Examples of encoding computers are disclosed in the Swiss Pat. specifications 408,109 and 411,983.

Figure 5:
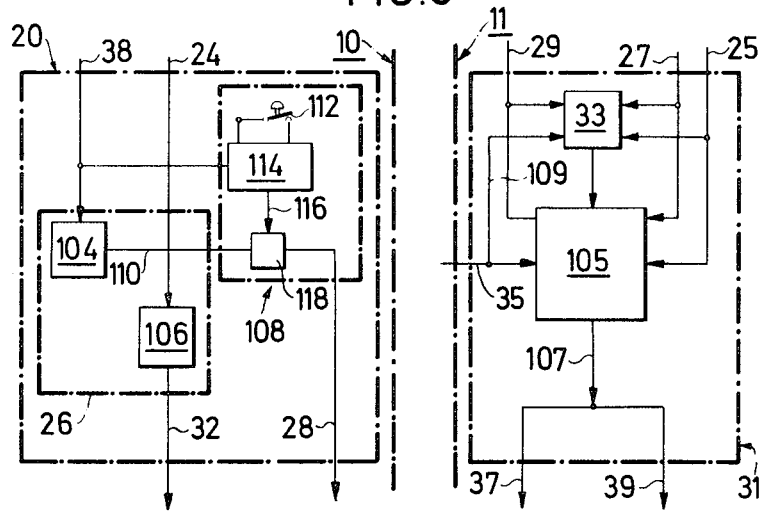
FIGS. 5 to 8 show block circuit diagrams of different modifications of the circuit assemblies of the identification unit and the testing station.

The method of operation of the secret circuit 31 of the testing station 11 in FIG. 5 is as follows.

Data from the primary store 12 is fed into the encoding computer 105 via the connecting line 35 and the data from the secret store 33 is also fed into the encoding computer 105 during a first time interval under control of the programme control systems 16, 23. This is accompanied by the simultaneous production of a specific encoding programme but this is initially not utilized.

The data from the primary store 12 may also be supplied via a connecting line 109 to the secret store 33 and permit selective recall of stored data.

The encoding programme which takes the form of a first data sequence is read out during a second time interval to the comparator 30 under control of a signal applied on the programme line 29.

Control applied via the programme line 25 in a third time interval results in a further read-out of the encoding programme which then passes as the second data sequence to the comparator 41 via the connecting lines 107 and 39

Apart from the physical construction of the encoding computer it is the data from the primary store 12 and the data from the secret store fed into the encoding computer during a time interval which define the production of the first as well as the second data sequence in the testing station.

Nevertheless, the two data sequences do not have any recognizable correlation with each other and knowledge of one programme does not enable the other to be computed as already mentioned.

The secret circuit 20 includes the secret store 26 having two parts 104 and 106 and a memo number input device 108. In many cases it is possible to dispense with the memo number input device. In such cases the output line 110 from the store part 104 would be directly connected to the connecting line 28 and this case will be described first.

The first data sequence of the identification unit is stored as secret data in the store part 104 from which it may be recalled any number of times, the data sequence being identical to the first data sequence of the testing station.

The store part 106 contains the second data sequence of the identification unit as secret data and this is identical with the second data sequence of the testing station.

During the second time interval referred to in the previous description of the operation of the testing section, the control signal applied by the connecting line 38 recalls the first data sequence from the store part 104 and transfers it to the comparator 30 via the connecting line 28 in synchronism with the read-out of the first data sequence from the encoding computer 105 of the testing station to the comparator 30 via connecting line 37.

As already mentioned, if the first data sequences correspond, the output line 40 of the comparator 30 (FIG.1.) is set to binary 1 and the gate circuit 34 (FIG.1) is opened.

During the third time interval the second data sequence of the identification unit is recalled from the store part 106 by a signal applied via the programme line 24, the data sequence being transferred via the connecting line 32 to the gate circuit 34 which is then opened and from the gate circuit to the comparator circuit 41 (FIG.1). This routine is performed simultaneously and in synchronism with the transfer of the second data sequence from the testing station which is read out from the encoding computer 105 via the connecting line 39, an acceptance signal 1 appearing on the output line 47 of the comparator 41 if the second data sequences correspond.

Since the data in the primary store 12 is individual for each identification unit and is effective as input data for the encoding computer 105 in addition to the data in the secret store 33 which is common to all data media, it follows that the first and second data sequences and therefore the contents of the secret store 26 and the store parts 104 and 106 thereof are different for each individual identification unit 10. Programmable ROM stores may be used as store parts 104 and 106 and these may be programmed prior to issue of the identification unit by using the first and second data sequences read out by the encoding computer 105 in the testing station and using the data in the primary store 12 of the unit whose ROM is to be programmed.

The memo number input device 108 stores a memo number which is entered by the user prior to each identification procedure and is automatically cancelled after each identification procedure. The memo number is intended to prevent an identification device being used by an unauthorized person.

The memo number, for example a four-digit decimal number, is manually entered and stored in binary encoded form in an electronic store 114 by means of a keyboard system 112. The control signal applied over the programme line 38 causes the secret data stored in the store part 104 to be read out via the connecting line 110 and the memo number to be read out over a connecting line 116 and mixed in a modulo-2-mixer 118 with the data from the store part 104, the resulting pulse sequence forming the first data sequence which is applied to the comparator 30 via the connecting line 28. The memo number in the store 114 may be automatically cancelled after it has been read out or it may be retained. The data in the store part 104 would differ in this case from the data sequence at the testing station by the memo number but this is taken into account and corrected when the identification unit 10 is prepared. If the memo number is not entered or incorrectly entered identification of the identification unit will result in a rejection signal being produced on line 49 (FIG.3.) line $q$).

One memo number input device will be explained subsequently with reference to FIG. 16.

Figure 6:
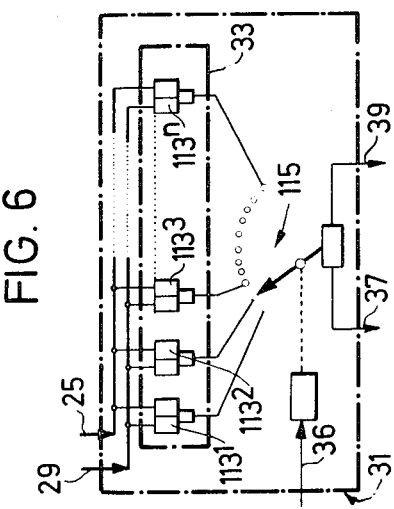

FIG. 6 shows a further variation of the secret circuit 31 of the testing station which is adapted to co-operate with the secret circuit 20 in the identification unit shown in FIG. 5. No encoding computer is provided but a data store 113 is used in the secret circuit for each of the different individual identification units which is identifiable by the testing station. For example, an identification unit (1) a store $113^1$ is provided, for an identification unit number (2) a store $113^2$, and for an identification unit number ($n$) a store $113^n$. The content of each of the stores $113^1$ to n corresponds to the store content of the store 26 of the corresponding identification unit. The left-hand half of each of the stores 113 corresponds to the store part 104 and includes the memo number if the latter is provided and the right-hand half corresponds to the store part 106 of the secret store 26 shown in FIG 5, An electronic binary counter multiplexer shown for clarity as an electronic selector switch 115 in FIG. 6 is set by the data for example a personnel number from the primary store 12 of an identification unit 10, to connect that store 113 which contains the same data to the connecting lines 37 and 39 so that control signals applied over lines 29 and 25 cause read out of the first and second data sequences to the comparators 30 and 41 for comparison with the corresponding data sequences from the identification unit.

This embodiment requires the testing station 11 to be provided with a separate store $113^1$ ... $113^n$ for each of the n identification units.

The data sequences produced by the secret circuit 31 of FIG. 5 as well as the secret circuit of FIG. 6, that is to say the first and second data sequences differ for each different identification unit due to the different contents of the primary stores 12 but remain the same for one and the same identification unit 10 during each fresh identification procedure.

For example if an unauthorized person were to succeed in determining the secret first and second data sequences it would be theoretically feasible to duplicate this specific data medium although it would be very difficult. If the data sequences remain identical it is therefore important to ensure that during the identification procedure radiation produced by operation of the circuits is reduced to a minimum by directly connecting the identification unit to the testing station instead of using radio transmission as described with reference to FIG. 4.

Even if the data sequences remain the same accessibility to such data sequences is possible only during the very short period of the identification procedure. The data medium itself cannot reveal anything because it delivers its second data sequence only if the correct first data sequence is properly identified by the testing station.

In order to avoid unauthorized persons accidentally finding the correct data sequence by entering a very long random programme including sequences which may include a correct data sequence which would trigger the production of the second data sequence, means may be incorporated to irreversibly block further operation of the identification unit.

Figure 7:
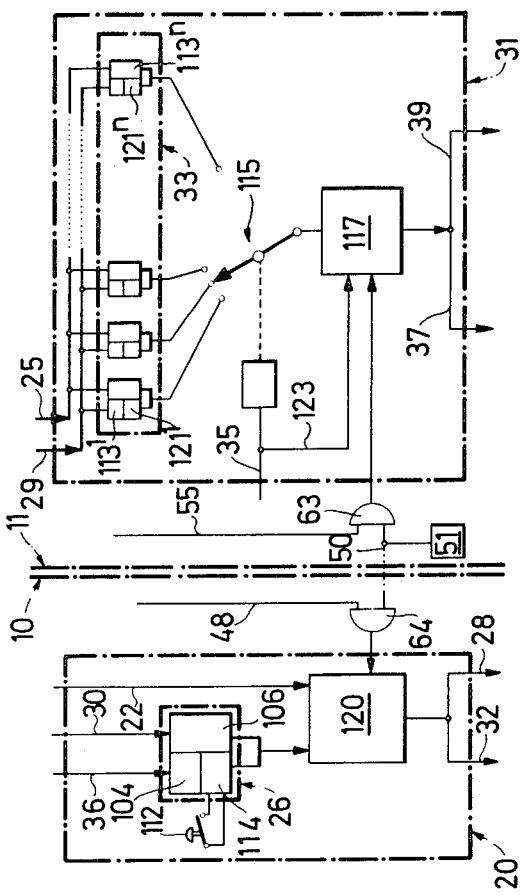

FIG. 7 shows a further embodiment of the secret circuits 31 and 20 both circuits containing an identical encoding computer 117 and 120 respectively. In contrast to FIG. 6, the electronic selector switch 115 does not pass the first and second data sequences but provides an input to the encoding computer 117, it is only the encoding computer output which supplies the first data sequence on connecting line 37 and the second data sequence on connecting line 39 in the form of an encoding programme.

The parts 104 and 106 of the data store 26 do not provide the first and second data sequences of the secret circuit 20 as in FIG. 5 insead the store 26 provides as input to the encoding computer 120 from whose output the first data sequence is obtained on connecting line 28 and the second data seuqence is obtained on connecting line 32 in the form of an encoding programme.

The individual stores $113^1$ to $113^n$ in the secret circuit 31 and the store parts 104, 106 of the identification unit 10 are as previously described with reference to FIGS. 5 and 6. The testing station secret store 33 includes store parts $121^1$ to $121^n$ in which the individual memo numbers are stored while the keyboard device 112 may be used for entering a memo number into the store part 114 of the identification unit which in this case is part of the store 26.

The contents of the primary store functions as input data for the encoding computers 117 and 120, the primary store being connected to the encoding computer 117 via a connecting line 123 branching from the connecting line 35 to the encoding computer 117 and to the encoding computer 120 via the connecting line 22 (see FIG. 1).

Random data generated in the random generator 51 provides further input data for the two encoding computers 117, 120 via the gate circuits 63 and 54 respectively.

The aforementioned random data, read out as a binary pulse programme by the random generator 51 and produced, for example, by means of a noise source, is passed by gate circuits 54 and 63 which are opened by signals on the programme lines 48 and 55 at the beginning of the identification procedure during the first time interval and arrives simultaneously and in identical form at the encoding computer 120 via the gate circuit 54 and at the encoding computer 117 via the gate circuit 63.

The random pulse generator 51 produces fresh random data with each fresh identification procedure so that the first and second data sequences are different on practically each occasion even if the same identification unit is repeatedly identified. In theory it is possible for the random data to be repeated by coincidence. However this cannot occur before approximately $10^{30}$ timing pulses have elapsed if the data has a length of 100 bits. In this way an unauthorised person cannot achieve anything by evaluating data passed during the identification procedure and duplication of the data in the identification unit is rendered impossible. The data sequences which may have been detected by spurious radiation from the circuits during an identification procedure are of no use to the unauthorised person because they are completely different for the next identification procedure.

Accordingly, radio transmission between the identification unit and the testing station is possible even without further safety measures. Digital time data produced by means of an electronic clock (42, 53, see also FIG. 1) may be used as additional data for the encoding computers 120 and 117 instead of the random data.

A further embodiment of the secret circuits 20 and 31 will not be described with reference to FIG. 8. Part of these secret circuits corresponds substantially to the embodiment shown in FIG. 5 but in FIG. 8 the output line of the store part 106, the output of mdoulo-2-mixer 118 and the two output lines from the encoding computer 105 which carry identical data do not act as read-out lines for the first and second data sequences but are input lines for the encoding computers 120 and 117 which are identical to each other. The connecting lines 32 and 28 and 37 and 39 which carry the first and second data sequences are only connected to the output of the aforementioned encoding computers.

The secret circuit 31 of the testing station 11 therefore contains two encoding computers, namely the main encoding computer 105 and the encoding computer 117 while the secret circuit 20 of identification unit 10 is provided only with the encoding computer 120.

The principal purpose of the encoding computers 117 and 120 is to provide variability of the data seuqences which are read out in accordance with digital time data. The required secrecy level of the aforementioned encoding computers is relatively low and they may therefore be simply and inexpensively constructed. The main encoding computer 115 on the other hand is constructed to provide a high degree of secrecy and has a complex circuit.

Variability of the first and second data sequences is achieved as already indicated by utilising digital time data obtained from the electronic clocks 43 and 42. The time data may be transmitted from the testing station to the identification unit or it may be individually produced. This is advantageous if the identification unit 10 is made in the form of a wristband and the clock functions as a wristwatch. The time data is selected by signals applied to the programme lines 48 and 55 and passes via the gate circuits 46 or 59 respectively in the form of input data to the encoding computers 120 and 117.

The time data may also be used to form so-called "time windows", that is to say, for forming time intervals which are the only time during which identification is possible. The time is set at the testing station, for example to 14 h. 20 min. If it is assumed that only the hour indication and the tens digit of the minute indication is significant for the data, it means that an identification unit can be identified only between 14.20 h. and 14.30 h. so that the device may also be employed as a time safety lock.

The general aspects of utilising time data for encoding purposes are disclosed in the Swiss Pat. Specification No. 411,983.

The store parts 104 and 106, shown separately in the examples described above, may comprise a single integrated circuit.

After each identification procedure the encoding computers 120 and 112 are returned to their initial state by a resetting device of known kind, that is to say they are "set to zero".

Figure 8:
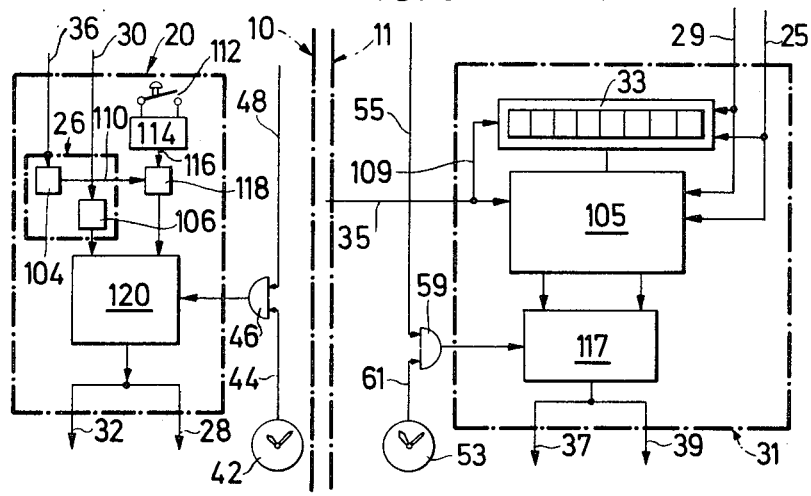

In the embodiment of FIG. 8 it is possible for part of the testing station secret store to be allocated to the individual identification unit in a mamner similar to that described with reference to FIG. 7 and a further part may be common to all units in a manner similar to that described with reference to FIG. 5 so that a very high degree of secrecy can be achieved.

Only 1 parity bit per data sequence is required for security of data transmission because anticipated interference is slight and an identification procedure may be repeated within seconds if it is subjected to interference.

The elements in the identification unit which are to be kept secret and remain inaccessible to the person possessing that unit comprise the secret circuit 20 which includes the secret data store 26, the comparator 30, the gate circuit 34 and, if provided, the quantity store 56, the gate circuit 62, 64 and their interconnections as shown within by the broken line 66 of FIG. 1.

The elements may be embedded into a suitable compound preferably a plastics compound which cannot be readily destroyed. Some examples of this form of encapsulation are described below.

Figure 9:
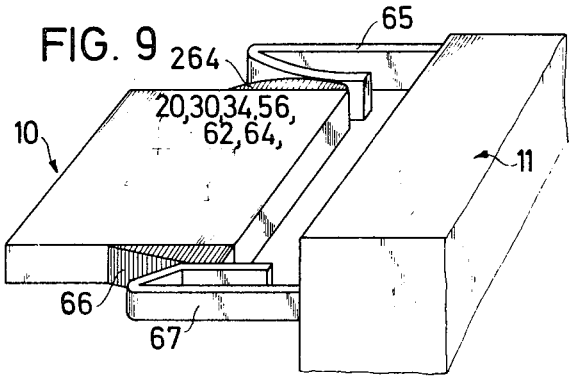
FIGS. 9 to 11 show some external shapes of the identification unit.

FIG. 9 shows an identification unit 10 in the form of a card with two contacts 264 and 66. The unit need be inserted only for fractions of a second into mating contacts 65 and 67 of the testing station 11 for completion of the identification procedure (see also the diagram of FIG. 2). The unit 10 comprises plastics plate 2 to 3 mm thick, 3 cm long and 3 cm wide in which all the circuit elements 20, 30, 34, 56, 62 and 64 are embedded in an inaccessible manner.

Figure 10:
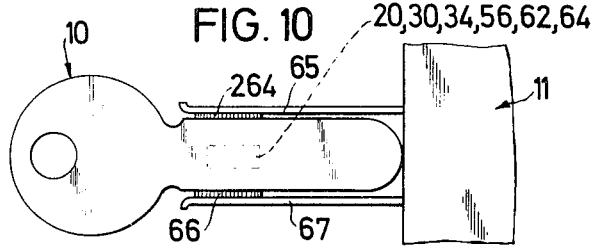

FIG. 10 shows an identification unit in the form of a key whose actual size corresponds approximately to that of a normal key. The testing station in this case may perform the function of an electronic lock.

Figure 11:
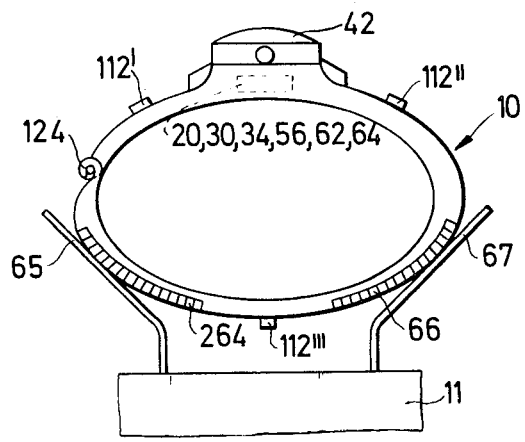

FIG. 11 shows an identification unit in the form of a wrist strap which may be secured to an electronic clock 42 providing the digital time data for the encoding computer. The secret circuit elements 20, 30, 34, 56, 62, 64 are again inaccessible by being embedded in plastics as shown. Data transmission is effected by means of two direct contacts 264 and 266 forming a V-shaped recess. To identify the unit it is merely necessary for the strap to be lowered against the V-shaped mating contacts 65 and 67 of the testing station 11.

The circuit elements of the identification unit may also be located in a container mounted on the strap or in the watch itself.

As shown below wrist straps with elements incorporated therein offer further advantages for personnel identification.

FIG. 11 shows push-buttons 112′, 112″ and 112‴ which are used for entering the memo number. A block circuit diagram for effecting this function is shown in FIG. 16 and the method of operation is as follows. To enter a memo number, for example the number 3748, the push-button 112′ is depressed three times for the first numeral 3 which causes the first number to be stored in the digit store element 114′. The push-button 112″ is then depressed once to effect a shift of the decimal point to the second position and the push-button 112′ is then depressed seven times to store the digit 7 in the store element 114″ and so for the subsequent digits 4 and 8. The memo number will then be available for recall during the identification procedure on the output line 116. The memo number may be cancelled by means of the push-button 112‴.

Cancellation may however also be performed by a switch 122 which is actuated by the closure 124 of the wrist strap (FIG. 11). As long as the strap is worn on the wrist the memo number is retained for identification and is cancelled automatically when the strap is removed from the wearer's wrist.

Figure 16:
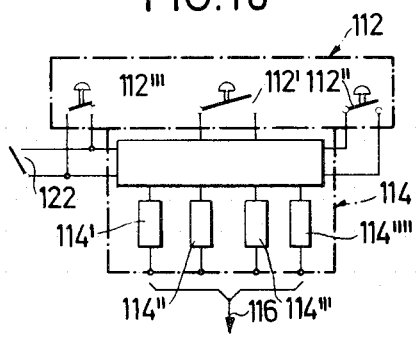
FIGS. 16 to 17 are simplified block circuit diagrams of further embodiments of the present invention.

Instead of being mounted in the strap itself the circuit of FIG. 16 may be mounted on a supporting member fixed to the strap or in the watch itself.

The measures described hereinabove are designed to prevent "electrical" accessibility to the secret data in th identification unit 10.

Unauthorized duplication and misuse of the identification unit 10 may be prevented as already mentioned by encapsulation of the circuit assemblies in a plastics compound so that access to the circuit assemblies is possible only by destroying the identification unit 10. Further measures may however also be taken so that in the event of the destruction by misuse which might facilitate accessibility to the secret circuits the data content thereof also disappears.

Figure 12:
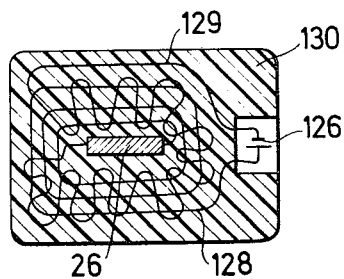
FIGS. 12 to 15 show different sectional shapes of the identification unit.

An example of such a measure is explained with reference to FIG. 12. The secret store 26 such as a RAM (Random Accesses Memory) or a shift register in MOS or C-MOS techniques of the identification unit is an integrated circuit fed by a battery 126 located in the unit. These elements require a permanent although extremely small current feed from the battery in order to retain the stored data. If the feed is only briefly interrupted to stored data disappears. The supply of feed current to the secret store 26 in FIG. 12 is provided by a negative feedline 128 and a positive feedline 129. These lines comprise lacquer insulated copper wire of 0.1 to 0.2 mm diameter and several metres in length.

The feedlines 128, 129 as well as the store 126 are firmly packed, in a plastics compound 130, the store 26 being disposed innermost in the encapsulated member and the feedlines 128, 129 surround the store 26 on all sides. The positive and negative feedlines 128, 129 are laid at random and irregularly with an average distance between conductors of for example 0.5 mm. Any attempt to gain access to the store 26 inevitably leads to the destruction of the encapsulated member and therefore to an interruption or short-circuit between feed conductors so that the stored data disappears. Unauthorized accessibility to the secret data is therefore prevented.

The feedlines 128, 129 may be installed by machines controlled by random data in such a way that the conductors are diffently installed for each unit.

Figure 13:
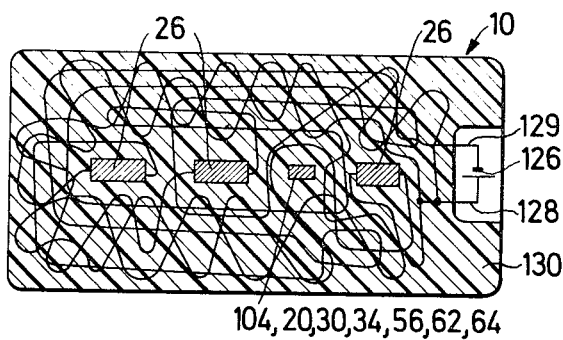

In FIG. 13 three parallel connected positive and negative conductors and store parts 26 are provided to render unauthorized accessibility to the secret data even more difficult. In this embodiment the remaining circuit elements 20, 30, 34, 56, 62, 64 containing secret data together with their interconnections are also closely surrounded by the feedlines 128 and 129 so that material access to them can be gained only after forcibly cancelling the secret data.

Interference voltages or currents may be induced into the long feedlines and thus impair reliable operation. This is avoided in the embodiment of FIGS. 14 and 15 by the provision of a special integrated circuit element designated as destruction detector 132 whose feedlines 134 and 136 surround the secret circuits 20, 26, 30, 34, 56, 62, 64 and are wound so that induced voltage is cancelled out, for example by twisting the wires together. These lines are connected to element 138 which may be a battery. The circuit element 138 may however be a logic circuit and the lines 134, 136 may be electrically insulated conductors. In the event of interruption and/or short-circuit of the conductors 134, 136 the secret store 26 is supplied via the connecting conductor 140 with cancelling data which irreversibly cancels the stored data. The feedlines which extend to the store 26 in this case may be short and not very prone to induced interference.

Figure 14:
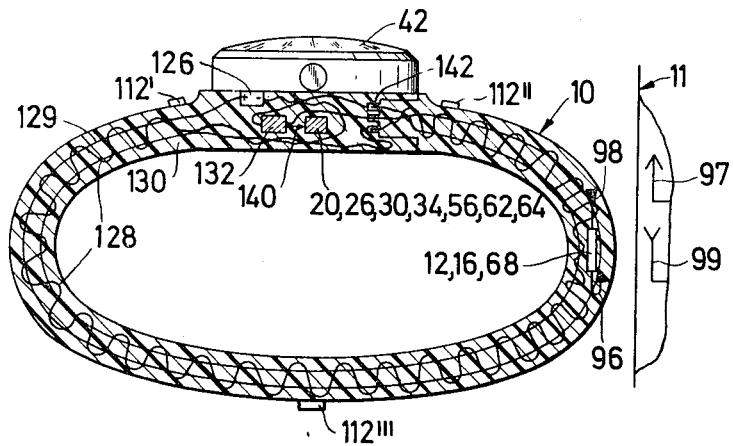
Figure 15:
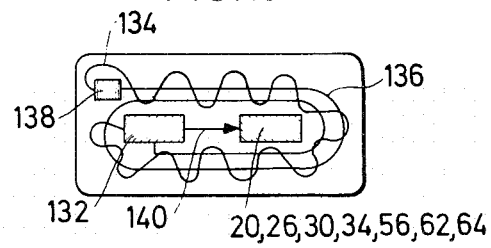

FIG. 14 shows an identification unit 10 in the form of wristwatch. The circuit elements 20, 26, 30, 34, 56, 62, 64 which carry the secret data and their interconnections are formed as a block of integrated circuits and are protected against accessibility in the above-described manner by embedding in a plastics compound and by the lines 128, 129 which surround them. The lines in this case are the feedlines of the destruction detector 132. As long as it is supplied with a feed voltage the detector supplies binary 1 data via the line 140 to the secret store 26. As soon as the feed voltage is interrupted a binary 0 appears on the connecting line 140 and serves as a cancellation pulse for irreversibly cancelling the data in the store 26. The conductor wires run throughout the entire length of the strap so that separating the strap is not possible without interrupting or short-circuiting the conductor wires.

The conductor wires also pass to a plug connection 142 having pins in the closure device of the strap so that the conductors are interrupted when the plug is separated and the strap removed from the wearer's wrist. The identification unit which is constantly worn on the wrist represents a secure personnel identification means which cannot be duplicated and in the present case also cannot be transferred to other persons. To this end it is merely necessary for the strap to closely surround the wrist to prevent sliding the strap over the hand. To avoid the plug contacts being bridged when the plug connection 142 is separated the recessed plug part has a longer length than the plug pins.

The non-secret circuit parts 12, 16, 68 (see also FIG. 2) may be located at any position in the strap and may also be combined into a block of integrated circuits.

In the embodiment of FIG. 14 the identification process may be performed by more approach of the wrist to the testing station 11 because data transmission is by radio means as indicated by the appropriate transmission and reception aerials 96, 97 and 98, 99.

It is often desirable for an identification unit to be used as identification means in different organisations, for example in a supermarket, a bank, a working place or an official office. For example if the embodiment of FIG. 5 were to be chosen these organisations would have to agree to common secret data and a common identical encoding computer 105, the secret data being identical for all and being stored in the store 33.

Figure 17:
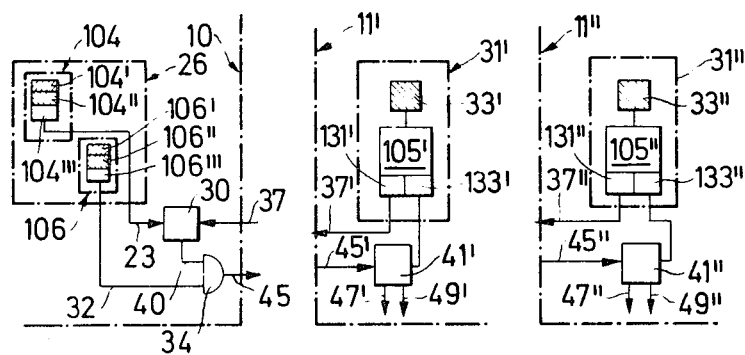

The embodiment of FIG. 17 shows a suitable adaptation of the apparatus according to FIG. 5 for identification purposes, for example in three organisations where the circuit elements associated with the organisations are designated with reference numerals having one, two or three primes.

All circuit parts which are of secondary importance for the explanation of this embodiment are omitted from FIG. 17. The identification unit 10 is identifiable in the testing stations 11' and 11'' as well as in another testing station which is not shown. The testing stations are provided with secret data which differ from each other and are stored in the secret stores 33', 33'' as indicated by hatching. The three testing stations also have different encoding computers 105' and 105''. The first data sequences differ from each other and the second data sequences also differ from each other. The secret stores 104 and 106 each comprise three part stores in the secret circuit 26. They contain the following secret data: 104' contains the 1st data sequence for the 1st organisation 104'' contains the 1st data sequence for the 2nd organisation 104''' contains the 1st data sequence for the 3rd organisation 106' contains the 2nd data sequence for 1st organisation 106'' contains the 2nd data sequence for the 2 nd organisation 106''' contains the 2nd data sequence for the 3rd organisation The stored data is produced by the encoding computers as an encoding programme with the coordinated secret data, identically hatched in FIG. 17, as input data for the encoding computer. No conclusions regarding the content of the individual secret stores 33' and 33'' of the testing station 11', 11'' of the different organisations can therefore be drawn even if the secret data stored in the store parts 104 and 106 of the identification unit is known.

During an identification procedure in one of the three identity testing systems the three first data sequences are successively obtained from the store parts 104', 104'' 104'''. The first data sequence at the testing station passes three times in succession to the comparator 30 since three organisations are concerned so that a comparison may be made with all three secret data of the store part 104. If data identity is detected at any one of the three comparisons a binary 1 will appear at the output 40 of the comparator 30 and the gate circuit 34 will be opened.

The three sets of secret data then pass in the form of second data sequences to the identification unit from the part stores 106', 106'' and 106''' to one of the comparators 41', 41'' where they are successively compared with the second data sequence from the testing station which is made available three times. If data identity is detected at any one of the three comparisons the acceptance line 47 of the corresponding testing station will be set to a binary 1 and the identification is evaluated as recognised and correct. In order to feed the first and second data sequences from the testing station three times in succession to the comparators 30 and 41', 41'' and so on, the system is provided with stores 131' and 131'' and 133'' whose contents can be repeatedly recalled.

Instead of successively comparing the data in the identification unit with that provided by the testing stations for each identification procedure, one station may be adapted by means of selection data transmitted to the identification unit to select only the secret data which is associated with that testing station whereafter comparison is performed only with the selected data.

It is of course possible for more than two or three different testing stations to be provided.

If the testing stations are used as electronic locks a identification unit 10 according to FIG. 17 can be used having an external shape as shown in FIG. 10 of that of a master key by means of which all locks may be opened. A key which only opens a single lock in a testing station 11, need only contain a single set of secret data in the store parts 104 and 106, namely those in the store parts 104' and 106'.

The amount of time required for an identification procedure may be easily kept below 0.1 second. Even with a relatively low timing frequency of 10,000 cycles per second and a transmission rate of 10,000 bits/ second and when employing identification units for use in five different organisations, the time for an identification procedure, amounts only:

| | |
|---|---|
| Data from the primary store 12×64 bits | 6.4.ms. |
| 5 times the first data sequence 5×64 bits | 32 ms. |
| 5 times the second data sequence 5×64 bits | 32 ms. |
| Total approximately | 70 ms. |

Duplication of the data in an identification unit by "trial" is practically impossible as is explained by the following example.

A length of the first data sequence of, for example, 128 bits provides more than $10^{30}$ variations. The "coincidental" finding of the correct data sequence even with a high timing frequency of $10^8$/ sec would still require an average of $10^{22}$secs, which is more than $10^{14}$ years.

The first and the second pulse sequence in at least some of the embodiments described hereinabove may be identical. This enables store capacity in an identification unit to be saved and/or that in the testing station. The first and the second pulse sequence may be obtained successively from the same store or the same part store.

Finally it should be mentioned in connection with the embodiment illustrated in FIG. 11 that this or similar embodiments by themselves are of great advantage because detaching the identification unit constructed as a wristwatch renders the unit useless in the sense that it cannot produce any further acceptance signal at the testing station and furthermore that the secret data contained in store remains secure against unauthorized access.

What is claimed is:

1. An identification system comprising:
a testing station, and
a plurality of identification units, each unit comprising,
a first store storing data unique to that unit,
a first generator coupled to said first store for generating first and second data sequences coded by the data stored in said first store, and
a first comparator,
said testing station including,
a second generator generating first and second data sequences corresponding to those sequences generated by said first generator,
a second comparator,
means for coupling a unit to said testing station to apply the first data sequences generated by said first and second generators to said first comparator; said first comparator generating a signal upon correspondence between said first data sequences, means responsive to said signal to trigger the first generator to generate said second data sequence, and means for applying the second data sequences from said first and second generators to said second comparator to produce an output signal therefrom upon correspondence between the two second data sequences.

2. A system according to claim 1 in which each unit further includes a second store storing data identifying an individual to whom the unit is to be issued, said second store being coupled to said first generator which is adapted to generate said first and second data sequences coded by data in both said first and second stores and wherein said second generator is adapted to generate data sequences corresponding to the first and second data sequences coded by the data in both said first and second stores.

3. A system according to claim 2 wherein said testing station includes a third store having a plurality of pairs of stages corresponding in number to the number of identification units, one stage of each pair storing data of the first data sequence as coded by the data in both first and second stores and as generated by the second generator and the other stage of each pair storing data of the second data sequence generated by said second generator.

4. A system according to claim 2 in which said second generator includes a fourth store storing data of the first and second data sequences generated by said second generator and an encoding computer responsive to data corresponding to the identifying data stored in said second store and the data in said fourth store to generate said first and second data sequences.

5. A system according to claim 1 wherein said first store comprises first and second parts, said first part storing the data of said first data sequence and the second part storing the data of said second data sequence.

6. A system according to claim 1 wherein each first generator includes an encoding computer responsive to the data stored in said first store to generate said first and second data sequences.

7. A system according to claim 6 wherein each unit includes a fifth store storing data identifying an indiviudal to whom the unit is to be issued, said encoding computer being responsive to the data in said first and fourth stores to generate said first and second data sequences.

8. A system according to claim 2 wherein said testing station includes a generator generating random signals and applying them to said first and second generators to modify the first and second data sequences generated thereby.

9. A system according to claim 2 wherein said testing station and each said unit includes a clock supply time data modifying the first and second data sequences generated by said first and second generators.

10. A system according to claim 1 wherein each unit is constructed as a wrist band, said first store, first generator and first comparator being encapsulated integrated circuit elements incorporated in said band.

11. A system according to claim 10 wherein said band includes a releasable coupling enabling said band to be held on a wearer's wrist, said coupling including means for destroying the data in said first store when the coupling is released to remove the band from the wearer's wrist.

12. A system according to claim 10 wherein each said unit and said testing station includes radio transmission and reception means to enable each unit to be electromagnetically coupled to said testing station.

13. A system according to claim 10 wherein said band includes a clock providing timing pulses for controlling the generation by said first generator of said first and second data sequences.

* * * * *